(12) United States Patent
Lee et al.

(10) Patent No.: US 11,447,026 B2
(45) Date of Patent: Sep. 20, 2022

(54) CHARGING SYSTEM FOR VEHICLE AND BATTERY CHARGING STOP METHOD THEREOF

(71) Applicants: Hyundai Motor Company, Seoul (KR); Kia Motors Corporation, Seoul (KR)

(72) Inventors: Sang Kyu Lee, Whasung-Si (KR); Jin Gyu Lim, Whasung-Si (KR); Seung Myun Chung, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 93 days.

(21) Appl. No.: 17/116,313

(22) Filed: Dec. 9, 2020

(65) Prior Publication Data
US 2021/0316630 A1 Oct. 14, 2021

(30) Foreign Application Priority Data
Apr. 14, 2020 (KR) ................. 10-2020-0045091

(51) Int. Cl.
| | |
|---|---|
| *B60L 53/62* | (2019.01) |
| *H02J 7/24* | (2006.01) |
| *H02J 7/00* | (2006.01) |
| *H02P 27/06* | (2006.01) |
| *B60L 50/60* | (2019.01) |
| *B60L 53/24* | (2019.01) |

(Continued)

(52) U.S. Cl.
CPC ............... *B60L 53/62* (2019.02); *B60L 50/60* (2019.02); *B60L 53/24* (2019.02); *B60L 58/10* (2019.02); *H02J 7/0029* (2013.01); *H02J 7/0047* (2013.01); *H02J 7/0068* (2013.01); *H02J 7/24* (2013.01); *H02M 7/53871* (2013.01); *H02P 27/06* (2013.01); *H02J 2207/20* (2020.01)

(58) Field of Classification Search
CPC ........ H02J 7/02; H02J 2207/20; H02J 7/0029; Y02T 10/7072; Y02T 90/14; H02M 3/1584; H02M 7/53871; H02M 1/0095; B60L 50/60; B60L 53/60; B60L 3/0046; B60L 58/10; H02P 27/06
See application file for complete search history.

(56) References Cited

U.S. PATENT DOCUMENTS

| | | | | |
|---|---|---|---|---|
| 2012/0187755 | A1* | 7/2012 | Sone ....................... | B60L 1/003 307/9.1 |
| 2013/0038120 | A1* | 2/2013 | Mimatsu ................. | H02J 1/102 307/77 |

(Continued)

FOREIGN PATENT DOCUMENTS

| | | |
|---|---|---|
| JP | 2017046406 A | 3/2017 |
| KR | 20080053992 A | 6/2008 |
| KR | 101684064 B1 | 12/2016 |

*Primary Examiner* — Jared Fureman
*Assistant Examiner* — Duc M Pham
(74) *Attorney, Agent, or Firm* — Morgan, Lewis & Bockius LLP

(57) ABSTRACT

A charging system for a vehicle and a battery charging stop method thereof may provide a charging system for a vehicle and a battery charging stop method thereof, which may stop the charging of a battery upon failure of a current sensor applied to a three-phase coils of a motor configured for driving a vehicle, preventing the occurrence of the torque caused by operation of the motor.

20 Claims, 4 Drawing Sheets

(51) Int. Cl.
*B60L 58/10* (2019.01)
*H02M 7/5387* (2007.01)

(56) References Cited

U.S. PATENT DOCUMENTS

| | | | |
|---|---|---|---|
| 2014/0167669 A1* | 6/2014 | Lim | B60L 50/16 |
| | | | 324/750.02 |
| 2020/0127592 A1* | 4/2020 | Lee | H02M 7/53876 |
| 2020/0373781 A1* | 11/2020 | Lee | B60L 53/24 |

* cited by examiner

CHARGING SYSTEM FOR VEHICLE AND BATTERY CHARGING STOP METHOD THEREOF

CROSS-REFERENCE TO RELATED APPLICATION

The present application claims priority to Korean Patent Application No. 10-2020-0045091 filed on Apr. 14, 2020, the entire contents of which is incorporated herein for all purposes by this reference.

BACKGROUND OF THE INVENTION

Field of the Invention

The present invention relates to a charging system for a vehicle and a battery charging stop method thereof, and more particularly, to a charging system for a vehicle and a battery charging stop method thereof, which may prevent a rotating operation of a motor which is caused by failure of a current sensor while charging a battery.

Description of Related Art

A vehicle using a motor as a driving source, such as a hybrid vehicle or an electric vehicle has a battery, which provides power to the motor, mounted therein.

In recent years, the battery has a gradually higher voltage specification to shorten a charging time. However, a charging infrastructure for charging the high-end battery is not provided smoothly yet.

A general charging system may also charge the high-end battery when additionally applying a boost converter. However, if the boost converter is added, a problem occurs in that the size and cost of the charging system increases.

Accordingly, the conventional charging system may boost the output of an external charger through an inverter which is connected to the motor to charge the battery with the boosted output. Accordingly, the charging system may perform a multi-charging function which charges the battery of various specifications, and such a charging system is also referred to as a multi-charging system.

The external charger is a charging facility outside the vehicle, and the external charger may supply power for charging the battery when being electrically connected to the battery.

FIG. 4 and FIG. 5 are circuit diagrams illustrating a conventional charging system.

As illustrated in FIG. 4, in the charging system, if an external charger 120 having the same output specification as a battery 110 is connected, a first relay 111, a second relay 112, and a third relay 113 are turned on and a fourth relay 114 is turned off, charging the battery 110.

Furthermore, referring to FIG. 5, in the charging system, if an external charger 120 having a lower output specification than the battery 110 is connected to the battery 110, the first relay 111, the second relay 112, and the fourth relay 114 are turned on and the third relay 113 is turned off such that the current having passed through three-phase coils 131, 132, 133 of a motor 130 and an inverter 140 is charged to the battery 110.

At the present time, the inverter 140 is operated in a boosting mode by operations of three-phase switch modules 141, 142, 143 to boost the output voltage of the external charger 120 to apply the boosted output voltage to the battery 110.

In the case of charging the battery 110 by use of the inverter 140, when even any one of current sensors 144, 145, 146 which detect the current passing through the three-phase coils 131, 132, 133 of the motor 130 fails, the current is not applied to one of the three-phase coils 131, 132, 133, causing the imbalance of the current applied to the three-phase coils 131, 132, 133.

When the battery 110 is normally charged, the current applied to the three-phase coils 131, 132, 133 is balanced.

When the imbalance of the current applied to the three-phase coils 131, 132, 133 occurs, the inductance value of the three-phase coils 131, 132, 133 is changed by the magnetic flux of a permanent magnet of a motor rotor, and as a result, the motor 130 rotates.

When the motor 130 rotates while charging the battery 110, there occurs a dangerous situation in which the vehicle is driven by the torque output by the motor 130.

That is, if even one of the current sensors 144, 145, 146 fails, there occurs a problem in that the motor 130 rotates while charging the battery 110, and the vehicle is driven by the motor torque according to the rotation of the motor 130.

Furthermore, if the motor 130 is continuously operated upon the failure of the current sensors 144, 145, 146, burning of the motor 130 is caused.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a charging system for a vehicle and a battery charging stop method thereof, which may stop the charging of a battery upon failure of a current sensor applied to a three-phase coils of a motor configured for driving a vehicle, preventing the occurrence of the torque caused by operation of the motor.

various aspects Accordingly, various aspects of the present invention provide a charging system for a vehicle including a motor configured to drive a vehicle; a battery which is connected to the motor and supplies power to the motor; an inverter which is mounted between the motor and the battery and configured to control a flow of a current between the motor and the battery; and a controller which is connected to the inverter and configured to control a switching duty of the inverter according to a previous duty command transmitted to the inverter just before an abnormal current sensor occurs, and then linearly decreases the switching duty of the inverter to reach zero, when the abnormal current sensor among current sensors, which are connected to the inverter and detect the amount of the current applied to a three-phase coils of the motor, respectively, occurs while the battery is charged through the motor and the inverter.

According to various exemplary embodiments of the present invention, all of switch modules of the inverter operate at the same switching duties according to the previous duty command, when the switching duty of the inverter is controlled according to the previous duty command.

The inverter may be configured to include a first switch module which is configured to control the flow of the current applied to a first coil of the three-phase coils of the motor; a second switch module which is configured to control the flow of the current applied to a second coil of the three-phase coils; and a third switch module which is configured to control the flow of the current applied to a third coil of the three-phase coils.

Furthermore, according to various exemplary embodiments of the present invention, the controller is configured to decrease switching duties of the first switch module, the second switch module, and the third switch module at the same ratios, when linearly decreasing the switching duty of the inverter.

Furthermore, according to various exemplary embodiments of the present invention, the controller may be configured to determine whether an output current of an external charger, which provides power for charging the battery, becomes zero when the switching duty of the inverter reaches zero, and determine that the charging of the battery is stopped when the output current of the external charger becomes zero.

Furthermore, according to various exemplary embodiments of the present invention, the controller may be configured to control the switching duty of the inverter according to the previous duty command for a time which is a predetermined multiple of a control cycle of the current applied to the motor.

Furthermore, according to various exemplary embodiments of the present invention, the controller may linearly decrease the switching duty of the inverter from a real-time switching duty value to 0% for a time which is a predetermined multiple of a control cycle of the current applied to the motor.

Furthermore, according to various exemplary embodiments of the present invention, the controller may be configured to determine that the abnormal current sensor occurs, if a rising slope of a voltage value across the coil and the rising slope of a voltage value detected by the current sensor are not the same when the switch module, which controls the flow of the current applied to each coil of the motor, is turned on.

Furthermore, according to various exemplary embodiments of the present invention, the controller may be configured to determine that the abnormal current sensor occurs, if a rising slope of a voltage value across the coil and the rising slope of a voltage value detected by the current sensor are different when the switch module, which controls the flow of the current applied to each coil of the three-phase coils in the motor, is turned off.

Meanwhile, various aspects of the present invention are directed to providing a battery charging stop method of a charging system for a vehicle, which includes a motor configured to drive a vehicle, a battery which is connected to the motor and supplies power to the motor, and an inverter which connects the motor with the battery, the method including determining whether an abnormal current sensor among current sensors, which are connected to the inverter and detect the amount of a current applied to a three-phase coils of the motor, respectively, occurs while the battery is charged through the motor and the inverter; controlling a switching duty of the inverter according to a previous duty command transmitted to the inverter just before the abnormal current sensor occurs, when it is determined that the abnormal current sensor among the current sensors occurs; making the switching duty of the inverter reach zero by linearly decreasing the switching duty of the inverter; and determining that the charging of the battery is stopped when the switching duty of the inverter becomes zero.

Through the above configurations, various aspects of the present invention provide the following effects.

Firstly, by stopping the charging of the battery upon the failure of the current sensor, it is possible to prevent driving of the vehicle caused by the operation of the motor.

Secondly, it is possible to prevent the dangerous situation caused by the driving of the vehicle while charging the battery.

Thirdly, it is possible to prevent the burning of the motor caused by the continuous operation of the motor upon the failure of the current sensor.

It is understood that the term "vehicle" or "vehicular" or other similar term as used herein is inclusive of motor vehicles in general such as passenger vehicles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
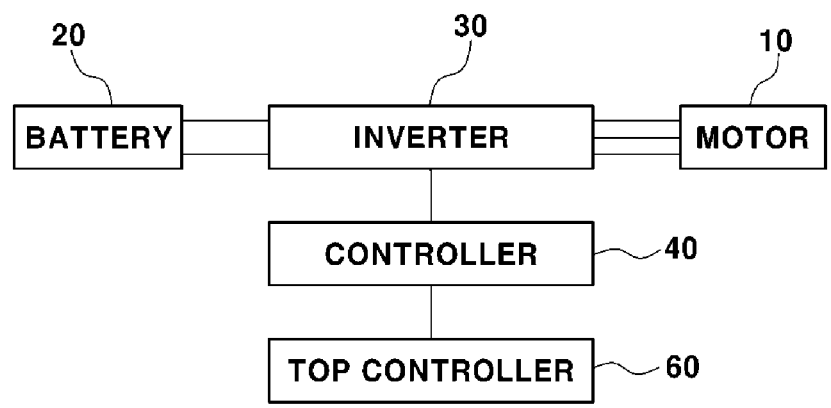
FIG. 1 is a block diagram illustrating a charging system according to various exemplary embodiments of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, positions, and shapes will be determined in section by the particular intended application and use environment.

In the figures, reference numbers refer to the same or equivalent sections of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, the present invention will be described with reference to the accompanying drawings so that those skilled in the art may easily carry out the present invention.

Figure 2:
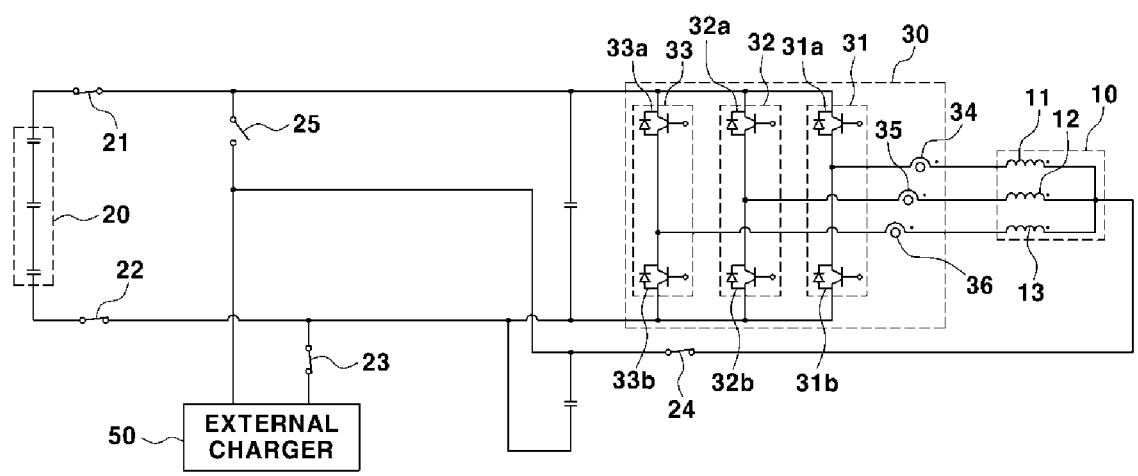
FIG. 2 is a circuit diagram illustrating a state where an external charger is connected to the charging system illustrated in FIG. 1.

FIG. 1 is a block diagram illustrating a charging system according to various exemplary embodiments of the present invention, and FIG. 2 is a circuit diagram illustrating a state where an external charger is connected to the charging system illustrated in FIG. 1.

As illustrated in FIG. 1 and FIG. 2, the charging system is configured to include a motor 10 which may generate a driving force for driving a vehicle, a battery 20 which may provide power for driving the motor 10 to the motor 10, and an inverter 30 which is disposed between the battery 20 and the motor 10 to electrically connect the battery 20 with the motor 10.

When the motor 10 is driven, the inverter 30 may convert DC power supplied from the battery 20 to the motor 10 into AC power to apply the AC power to the motor 10.

That is, the inverter 30 may convert the DC power of the battery 20 into the AC power for driving the motor 10 to supply the AC power to the motor 10.

At the present time, a switching operation of the inverter 30 may be controlled by a command of a controller 40 in the vehicle. The controller 40 may be a motor control unit which is pre-mounted to the vehicle.

The controller 40 may control the operations of switching elements 31a, 31b, 32a, 32b, 33a, 33b which configure the inverter 30 to convert the DC power supplied from the battery 20 to the motor 10 into the AC power used by the motor 10.

As illustrated in FIG. 2, the inverter 30 may include six switching elements 31a, 31b, 32a, 32b, 33a, 33b to convert the DC power into the AC power. Among the switching elements 31a, 31b, 32a, 32b, 33a, 33b, two switching elements connected in series become a one-phase switch module. That is, the inverter 30 may include three switch modules 31, 32, 33 which are connected in parallel.

The inverter 30 may be configured to include a first switch module 31, a second switch module 32, and a third switch module 33.

The first switch module 31 may be configured to intermittently control the flow of the current applied to a first coil 11 among a three-phase coils 11, 12, 13 of the motor 10. The second switch module 32 may be configured to intermittently control the flow of the current applied to a second coil 12 among the three-phase coils 11, 12, 13 of the motor 10. The third switch module 33 may be configured to intermittently control the flow of the current applied to a third coil 13 among the three-phase coils 11, 12, 13 of the motor 10.

When charging the battery 20 by use of an external charger 50 having a voltage specification lower than the output voltage of the battery 20, the inverter 30 may boost the output voltage of the external charger 50 to apply the boosted output voltage to the battery 20.

The inverter 30 may implement a boost mode of a general boost converter when charging the battery 20.

The output voltage of the external charger 50 may be boosted to the output voltage of the battery 20 through the boost control by the inverter 30. At the instant time, the switching operation of the inverter 30 may be controlled by the controller 40.

The external charger 50 is a power supplier outside the vehicle, and the external charger may supply the AC power for charging the battery 20 when being electrically connected to the battery 20. That is, the external charger 50 may also be referred to as an external AC power source.

When charging the battery 20, the inverter 30 may boost the power applied through the three-phase coils 11, 12, 13 of the motor 10 to supply the boosted power to the battery 20.

The inverter 30 may be operated in a boost mode by the switching operations of the switch modules 31, 32, 33 to boost the AC power supplied from the external charger 50 to the voltage level of the battery 20.

At the present time, the switch modules 31, 32, 33 are turned on or turned off according to the command of the controller 40.

As illustrated in FIG. 2, the motor 10 is a three-phase motor which includes the three coils 11, 12, 13 connected in parallel. The three coils 11, 12, 13 are three-phase coils of a motor stator, and may be the first coil 11, the second coil 12, and the third coil 13 which are connected in parallel.

The current having passed through the first coil 11 may be applied to the battery 20 through the first switch module 31, the current having passed through the second coil 12 may be applied to the battery 20 through the second switch mode 32, and the current having passed through the third coil 13 may be applied to the battery 20 through the third switch module 33.

Furthermore, the inverter 30 may be configured to include a first current sensor 34, a second current sensor 35, and a third current sensor 36. The first current sensor 34 may detect the amount of current (current value) flowing through the first coil 11. The second current sensor 35 may detect the amount of current flowing through the second coil 12. The third current sensor 36 may detect the amount of current flowing through the third coil 13.

The signals of the current sensors 34, 35, 36 may be transmitted to the controller 40, and the controller 40 may control the switching operation of the inverter 30 based on the signals of the current sensors 34, 35, 36.

Furthermore, when charging the battery 20 by use of the inverter 30 and the motor 10, a first relay 21, a second relay 22, a third relay 23, and a fourth relay 24 are turned on and a fifth relay 25 is turned off such that the external charger 50 may supply power to the battery 20 through the motor 10 and the inverter 30.

The first relay 21 and the second relay 22 are disposed to be connected to both end portions of the battery 20. The third relay 23 and the fifth relay 25 may directly connect the external charger 50 to the battery 20 when being turned on. The fourth relay 24 may directly connect the external charger 50 to the motor 10 when being turned on together with the third relay 23. Meanwhile, if one current sensor of the current sensors 34, 35, 36 of the inverter 30 fails while charging the battery 20, the switch module connected to the current sensor where the failure occurs may be immediately turned off.

For example, the first switch module 31 may be turned off when the first current sensor 34 fails, the second switch module 32 may be turned off when the second current sensor 35 fails, and the third switch module 33 may be turned off when the third current sensor 36 fails.

If the first switch module 31 is turned off, the flow of the current applied to the first coil 11 may be stopped, and if the second switch module 32 is turned off, the flow of the current applied to the second coil 12 may be stopped, and furthermore, if the third switch module 33 is turned off, the flow of the current applied to the third coil 13 may be stopped.

As described above, when no current is applied to any one coil of the three coils 11, 12, 13, a difference in the amount of the current applied to the three coils 11, 12, 13 occurs, causing the imbalance of the force acting on the rotor of the motor 10, and thus rotating the rotor.

When the rotor of the motor 10 rotates while charging the battery 20, motor torque is generated, and thus a problem of driving the vehicle may be caused.

If the battery 20 is normally charged, the output current of the external charger 50 is simultaneously applied to the three coils 11, 12, 13.

The controller 40 monitors whether failure of the current sensors 34, 35, 36 occurs while charging the battery 20 to prevent the motor torque from being generated while charging the battery 20.

The controller 40 may determine that any one current sensor of the current sensors fails, for example, if a signal value of any one current sensor is not generated while charging the battery 20, or the difference between the signal values of the current sensors 34, 35, 36 exceeds a predetermined error range, or if the motor 10 is driven to generate the motor torque.

Furthermore, the controller 40 may determine that the corresponding current sensor fails even when the signal value (that is, output voltage value) of the current sensor is the maximum signal value (that is, second output voltage value) of the set normal operation range or more or the minimum signal value (that is, first output voltage value) or less. The normal operation range may be the first output voltage value to the second output voltage value.

Furthermore, the controller 40 may determine that the current sensor, which detects the signal value of the slope different from the slope of the voltage across the inductor, fails, if the rising slope of the voltage across the inductor of the motor 10 and the rising slope of the signal values of the current sensors 34, 35, 36 are different when the switch modules 31, 32, 33 are turned on, or if the falling slope of the voltage across the inductor of the motor 10 and the falling slope of the signal values of the current sensors 34, 35, 36 are different from each other when the switch modules 31, 32, 33 are turned off.

The controller 40 may determine that the first current sensor 34 fails if the rising slope of the voltage value across the first coil 11 and the rising slope of the signal value (that is, voltage value) detected by the first current sensor 34 are not the same when the first switch module 31 is turned on.

The controller 40 may determine that the second current sensor 35 fails if the rising slope of the voltage value across the second coil 12 and the rising slope of the signal value detected by the second current sensor 35 are not the same when the second switch module 32 is turned on.

The controller 40 may determine that the third current sensor 36 fails if the rising slope of the voltage value across the third coil 13 and the rising slope of the signal value detected by the third current sensor 36 are not the same when the third switch module 33 is turned on.

Furthermore, the controller 40 may determine that the first current sensor 34 fails if the falling slope of the voltage value across the first coil 11 and the falling slope of the signal value detected by the first current sensor 34 are different when the first switch module 31 is turned off.

The controller 40 may determine that the second current sensor 35 fails if the falling slope of the voltage value across the second coil 12 and the falling slope of the signal value detected by the second current sensor 35 are different when the second switch module 32 is turned off.

The controller 40 may determine that the third current sensor 36 fails if the falling slope of the voltage value across the third coil 13 and the falling slope of the signal value detected by the third current sensor 36 are different when the third switch module 33 is turned off.

The voltages across the coils 11, 12, 13 may be measured by use of a voltage measurement circuit.

Hereinafter, a current sensor having failure among the three current sensors 34, 35, 36 will be referred to as an "abnormal current sensor".

When recognizing that any one current sensor of the current sensors 34, 35, 36 fails when charging the battery 20, that is, determining that the abnormal current sensor occurs while charging the battery 20, the controller 40 continues the duty command (that is, previous duty command) transmitted to the inverter 30 just before the abnormal current sensor occurs to prevent the motor 10 from outputting torque.

That is, when sensing failure of the current sensor while charging the battery 20, the controller 40 does not change the duty commands applied to the switch modules 31, 32, 33 of the inverter 30 and continues the switching operation of the inverter 30 in the same manner according to the previous duty command. At the instant time, all of the first switch module 31, the second switch module 32, and the third switch module 33 operate in the same manner according to the previous duty command.

Accordingly, after the abnormal current sensor occurs, the inverter 30 operates with the switching duty according to the previous duty command.

The inverter 30 maintains the switching operation according to the previous duty command for a predetermined time. That is, the inverter 30 continues the switching operations of the switch modules 31, 32, 33 for the predetermined time in the same manner as just before the abnormal current sensor occurs. The predetermined time may be set as at least 1 second, for example.

That is, the time during which the inverter 30 continues the switching operation according to the previous duty command may be set as a time which is 10 times the cycle (that is, the current control cycle) in which the current applied to the motor 10 is controlled. For example, if the current control cycle is 0.1 ms, the time during which the inverter 30 continues the switching operation according to the previous duty command may be 1 ms. As described above, if the duration of the switching operation of the inverter 30 is set, the charging system operates stably.

When the inverter 30 continues the switching operation in a situation where the abnormal current sensor occurs, the possibility of secondary failure increases.

Accordingly, when determining that the abnormal current sensor occurs and the predetermined time has elapsed, the controller 40 gradually decreases the switching duty of the inverter 30 and decreases the switching duties (that is, ON duties) of the first switch module 31, the second switch module 32, and the third switch module 33 at the same ratio.

By reducing the ON duties of the switch modules 31, 32, 33 at the same ratio, it is possible to maintain the balance of the force acting on the rotor of the motor 10. By reducing the ON duties of the switch modules 31, 32, 33 at the same ratio, the ON duties of the switch modules 31, 32, 33 may simultaneously reach 0%, preventing the rotating operation of the motor 10.

When the ON duties of the switch modules 31, 32, 33 are decreased differently, the imbalance of the force acting on the rotor of the motor 10 occurs, and as a result, the motor 10 is operated to generate the motor torque Furthermore, it is preferable to linearly decrease the switching duty when decreasing the switching duty of the inverter 30. At the instant time, a value derived through prior experiments or the like may be determined as a decreasing ratio of the switching duty.

The switching duty is decreased from the current switching duty value (that is, real-time switching duty value) to 0% for a predetermined time. The switching duty of the inverter 30 is controlled to linearly decrease from the real-time switching duty value to 0% for a time which is 100 times the cycle (that is, current control cycle) which controls the current applied to the motor 10. For example, if the current control cycle is 0.1 ms, the switching duty of the inverter 30 decreases from the real-time duty value to 0% for 10 ms.

Here, the secondary failure may be failure of other components in the charging system, and for example, may be failure of the motor 10.

When confirming that the switching duty of the inverter 30 is decreased and becomes 0%, the controller 40 may determine that the charging of the battery 20 is stopped, and may transmit a signal indicating that the charging of the battery 20 is stopped (that is, charging stop signal) and a signal indicating the occurrence of the abnormal current sensor (that is, sensor failure signal) to a top controller 60.

To more accurately determine whether the battery 20 stops charging, the controller 40 may further determine whether an output current of an external charger 50 becomes zero (0 A) when determining whether the switching duty of the inverter 30 becomes zero.

When confirming that the switching duty of the inverter 30 reaches 0% and confirming that the output current of the external charger 50 becomes zero (0 A), the controller 40 may determine that the charging of the battery 20 is stopped, and then transmit the charging stop signal and the sensor failure signal to the top controller 60.

The controller 40 may inform the top controller 60 of the reason that the charging of the battery 20 is stopped by transmitting the charging stop signal and the sensor failure signal to the top controller 60, and may also induce the replacement, repair, and the like of the abnormal current sensor.

The top controller 60 is an in-vehicle controller, and may be a top controller of a motor control unit of a vehicle.

Here, a battery charging stop method of the charging system according to various exemplary embodiments of the present invention will be described with reference to FIG. 3.

Figure 3:
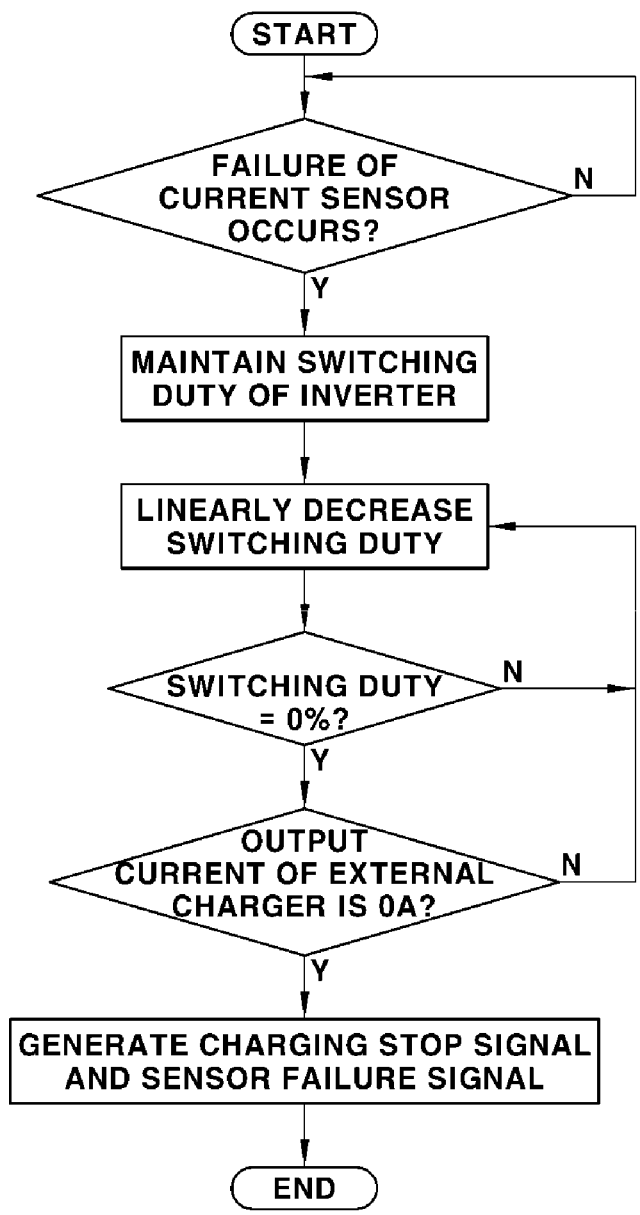
FIG. 3 is a flowchart illustrating a battery charging stop method of the charging system according to various exemplary embodiments of the present invention.
Figure 4:
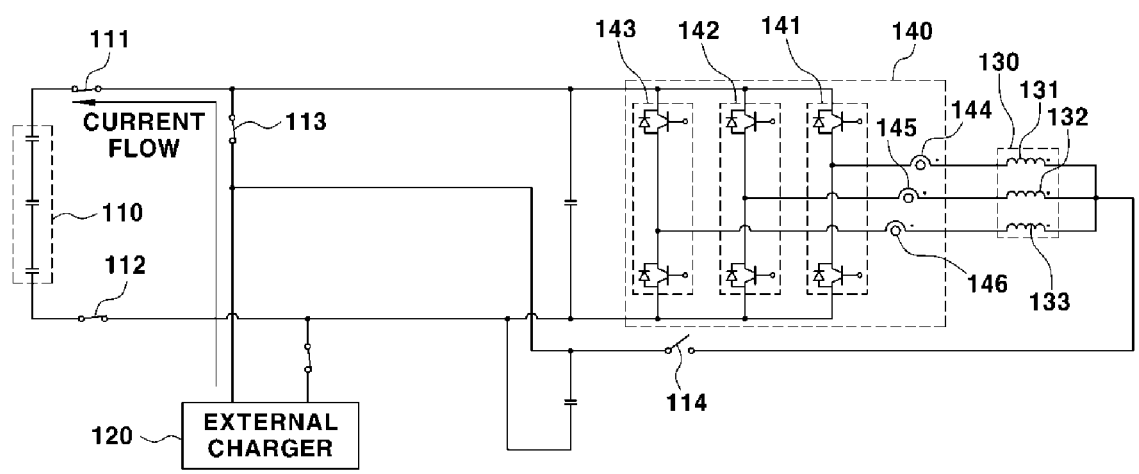
FIG. 4 and FIG. 5 are circuit diagrams illustrating a conventional charging system.
Figure 5:
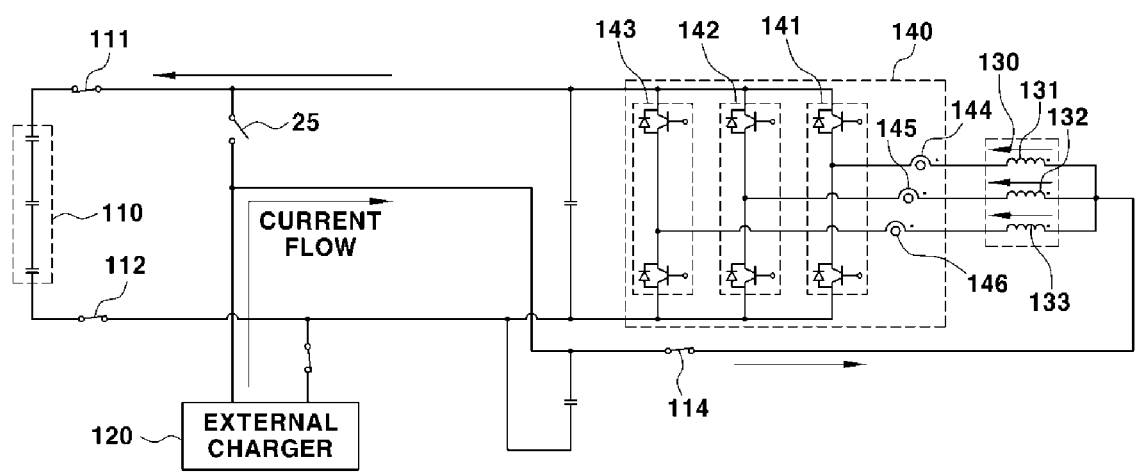

As illustrated in FIG. 3, the controller 40 monitors and confirms in real time whether an abnormal current sensor among the current sensors 34, 35, 36 of the inverter 30 occurs while charging the battery 20.

When determining that the abnormal current sensor has occurred, the controller 40 maintains the switching duty of the inverter 30 to be the same as that just before the abnormal current sensor occurs by the duty command (that is, previous duty command) transmitted to the inverter 30 just before the abnormal current sensor occurs.

To this end, when determining that the abnormal current sensor has occurred, the controller 40 does not transmit a new duty command to the inverter 30.

That is, when determining that any one current sensor of the first current sensor 34, the second current sensor 35, and the third current sensor 36 fails, the controller 40 does not transmit a new duty command to the inverter 30 so that the switching duty according to the previous duty command may continue.

The inverter 30 may continue the switching operation according to the switching duty according to the previous duty command as the new duty command is not transmitted from the controller 40.

The controller 40 linearly decreases the switching duty of the inverter 30 when a predetermined time has elapsed since the abnormal current sensor occurred. At the instant time, the ON times of the first switch module 31, the second switch module 32, and the third switch module 33 gradually decrease based on the switching duty according to the previous duty command.

When determining that the failure of the first current sensor 34 which detects the amount of the current applied to the first coil 11 has occurred, the controller 40 decreases the switching duty of the first switch module 31 at the same ratio as those of the switching duties of the second switch module 32 and the third switch module 33.

Furthermore, when determining that the failure of the second current sensor 35 which detects the amount of the current applied to the second coil 12 has occurred, the controller 40 decreases the switching duty of the second switch module 32 at the same ratio as those of the switching duties of the first switch module 31 and the third switch module 33.

Furthermore, when determining that the failure of the third current sensor 36 which detects the amount of the current applied to the third coil 13 has occurred, the controller 40 decreases the switching duty of the third switch module 33 at the same ratio as those of the switching duties of the first switch module 31 and the second switch module 32.

When the switching duties of the switch modules 31, 32, 33 are decreased and reach 0 (0%), the controller 40 confirms whether an output current of an external charger 50 is zero (0 A).

When confirming that the output current of the external charger 50 is zero, the controller 40 determines that the charging of the battery 20 is stopped, and generates a charging stop signal and a sensor failure signal to transmit the charging stop signal and the sensor failure signal to the top controller 60.

When receiving the charging stop signal and the sensor failure signal, the top controller 60 outputs a message indicating the charging stop of the battery 20 and a message indicating the failure of the current sensor to an internal display of the vehicle, and thus may inform the user of the charging stop of the battery 20 and the occurrence of the abnormal current sensor.

Furthermore, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by multiple controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A charging system for a vehicle, the charging system comprising:
   a motor configured to drive a vehicle;
   a battery which is connected to the motor and supplies power to the motor;
   an inverter which is connected between the motor and the battery and configured to control a flow of a current between the motor and the battery; and
   a controller which is connected to the inverter and configured to control a switching duty of the inverter according to a previous duty command transmitted to the inverter before an abnormal current sensor occurs, and then decreases the switching duty of the inverter to reach zero, when the abnormal current sensor among current sensors, which are connected to the inverter and detect an amount of the current applied to three-phase coils of the motor, respectively, occurs while the battery is charged through the motor and the inverter.

2. The charging system of claim 1,
   wherein the controller is configured to decrease linearly the switching duty of the inverter.

3. The charging system of claim 1,
   wherein all of switch modules of the inverter operate at same switching duties according to the previous duty command, when the switching duty of the inverter is controlled according to the previous duty command.

4. The charging system of claim 3, wherein the switch modules of the inverter include:
   a first switch module which is configured to control the flow of the current applied to a first coil of the three-phase coils of the motor;
   a second switch module which is configured to control the flow of the current applied to a second coil of the three-phase coils; and
   a third switch module which is configured to control the flow of the current applied to a third coil of the three-phase coils.

5. The charging system of claim 3,
   wherein the controller is configured to decrease switching duties of the first switch module, the second switch module, and the third switch module at same ratios, when linearly decreasing the switching duty of the inverter.

6. The charging system of claim 1,
   wherein the controller is configured to determine whether an output current of an external charger, which provides power for charging the battery, becomes zero when the switching duty of the inverter reaches zero, and configured to conclude that the charging of the battery is stopped when the output current of the external charger becomes zero.

7. The charging system of claim 2,
   wherein the controller is configured to control the switching duty of the inverter according to the previous duty command for a time which is a predetermined multiple of a control cycle of the current applied to the motor.

8. The charging system of claim 3,
   wherein the controller is configured to linearly decrease the switching duty of the inverter from a real-time switching duty value to 0% for a time which is a predetermined multiple of a control cycle of the current applied to the motor.

9. The charging system of claim 1,
   wherein the controller is configured to determine that the abnormal current sensor occurs, if a rising slope of a voltage value across at least a coil of the three-phase coils and a rising slope of a voltage value detected by at least one of the current sensors are not a same when a switch module of the inverter, which controls the flow of the current applied to each coil of the three-phase coils in the motor, is turned on.

10. The charging system of claim 1,
    wherein the controller is configured to determine that the abnormal current sensor occurs, if a rising slope of a voltage value across at least a coil of the three-phase coils and a rising slope of a voltage value detected by at least one of the current sensors are different when a switch module of the inverter, which controls the flow of the current applied to each coil of the three-phase coils in the motor, is turned off.

11. A battery charging stop method of a charging system for a vehicle which includes a motor configured to drive a vehicle, a battery which is connected to the motor and supplies power to the motor, and an inverter which connects the motor with the battery, the method including:
    determining, by a controller, whether an abnormal current sensor among current sensors, which are connected to the inverter and detect an amount of a current applied to a three-phase coils of the motor, respectively, occurs while the battery is charged through the motor and the inverter;
    controlling, by the controller, a switching duty of the inverter according to a previous duty command transmitted to the inverter before the abnormal current sensor occurs, when the controller concludes that the abnormal current sensor among the current sensors occurs;

making, by the controller, the switching duty of the inverter reach zero by decreasing the switching duty of the inverter; and determining, by the controller, that the charging of the battery is stopped when the switching duty of the inverter becomes zero.

12. The battery charging stop method of claim 11, wherein all of switch modules of the inverter operate at same switching duties according to the previous duty command, when the switching duty of the inverter is controlled according to the previous duty command.

13. The battery charging stop method of claim 12, wherein the switch modules of the inverter includes:

a first switch module which is configured to control the flow of the current applied to a first coil of the three-phase coils of the motor;

a second switch module which is configured to control the flow of the current applied to a second coil of the three-phase coils; and a third switch module which is configured to control the flow of the current applied to a third coil of the three-phase coils.

14. The battery charging stop method of claim 13, wherein the controller is configured to control the switching duty of the inverter to reach zero by linearly decreasing the switching duty of the inverter.

15. The battery charging stop method of claim 14, wherein switching duties of the first switch module, the second switch module, and the third switch module are decreased at same ratios, when the switching duty of the inverter is linearly decreased.

16. The battery charging stop method of claim 11, further including:

determining, by the controller, whether an output current of an external charger, which provides power for charging the battery, becomes zero when the switching duty of the inverter reaches zero, wherein the controller is configured to conclude that the charging of the battery is stopped when the output current of the external charger becomes zero.

17. The battery charging stop method of claim 15, wherein the controller is configured to control the switching duty of the inverter according to the previous duty command for a time which is a predetermined multiple of a control cycle of the current applied to the motor.

18. The battery charging stop method of claim 11, wherein the controller is configured to linearly decrease the switching duty of the inverter from a real-time switching duty value to 0% for a time which is a predetermined multiple of a control cycle of the current applied to the motor.

19. The battery charging stop method of claim 11, wherein the controller is configured to determine that the abnormal current sensor occurs, if a rising slope of a voltage value across at least a coil of the three-phase coils and a rising slope of a voltage value detected by at least one of the current sensors are not a same when a switch module of the inverter, which controls the flow of the current applied to each coil of the three-phased coils in the motor, is turned on.

20. The battery charging stop method of claim 11, wherein the controller is configured to determine that the abnormal current sensor occurs, if a rising slope of a voltage value across at least a coil of the three-phase coils and a rising slope of a voltage value detected by at least one of the current sensors are different when a switch module of the inverter, which controls the flow of the current applied to each coil of the three-phase coils in the motor, is turned off.

\* \* \* \* \*